Patented Jan. 26, 1954

2,667,457

UNITED STATES PATENT OFFICE 2,667,457

METHOD FOR PRODUCING GELS

Richard G. McChrystal, Tulsa, Okla., assignor to Stanolind Oil and Gas Company, Tulsa, Okla., a corporation of Delaware No Drawing. Application June 30, 1950, Serial No. 171,554

5 Claims. (Cl. 252—8.55)

1

The present invention relates to a method for effecting gelation of liquids. More particularly, it pertains to a method for effecting gelation of liquids employed in various hydraulic operations, such as, for example, those utilized in the fracturing of underground formations.

In the co-pending application U. S. Ser. No. 29,932, filed May 28, 1948, by J. B. Clark, now Patent No. 2,596,845, dated May 13, 1952, a procedure is described for effecting the fracture of an underground formation from which it is desired to produce oil, gas or various other minerals. According to the teachings there disclosed, increased quantities of such substances can be obtained by effecting a fracture of the producing structure to thereby render the oil, gas, or minerals contained therein more readily recoverable. Broadly, this object is accomplished by injecting a viscous oily liquid or gel under pressure into the formation to open up the latter, and thereafter reducing the viscosity of the liquid or gel while it is in the formation whereby a permeable channel is produced therein to allow this liquid and formation fluids to be conducted from the formation into the well bore.

Normally, such gels are prepared by adding a suitable bodying or thickening agent to an oily or base liquid such as, for example, crude oil or kerosene. At temperatures not substantially lower than 70 to 75° F. a gel is obtained which possesses properties satisfactory for use as a fracturing fluid.

While the procedure described in the co-pending application referred to above has met with an unusual degree of commercial success, difficulty has been encountered in the preparation of such fracturing gels during cold weather. Thus, at temperatures of about 60° F. and below, it is exceedingly difficult to obtain a satisfactory gel by known methods. In order to bring about gelation of the liquid at these lower temperatures, the mixture of bodying agent and oily liquid must be heated and continuously stirred. Heating in the field of the relatively large quantities of liquid required is somewhat dangerous because of the fact that a fire hazard is created by the use of gasoline, crude oil, or similar mixtures under these conditions. Moreover, such an operation obviously is awkward, expensive, and inconvenient. Also, while the heating of the oily liquid must be resorted to in order to effect proper gelation, it tends

2 to "unbalance" the composition of the liquid by driving off the more volatile components thereof. Although gels can be prepared from the liquids thus heated, they tend to break down at a slower rate after having been injected into the formation owing principally to the substantial absence of the light ends, thus further complicating the hydraulic fracturing operation. In addition to the foregoing difficulties encountered with gels previously made, I have found that the characteristics of such gels are markedly effected by the type of crude oil or base liquid used and the impurities contained therein.

Furthermore, in the past, gels have been prepared from crude oil or similar base liquids by combining basic reacting silicates with relatively high molecular weight acids such as, for example, those found in tall oil, to produce simultaneously a tall oil soap and silicic acid, both of which co-act to convert the base liquid into a gel-like structure. A gel of this type, at least for the purpose of formation fracturing operations, has several disadvantages. First of all, the basic silicates because of their generally syrupy consistency are difficult to handle and transport to relatively inaccessible locations, such as those encountered in oil field work. Moreover, in attempting to break such gels the silicic acid produces a curd-like precipitate, thereby tending to plug any channels formed during the fracturing operation.

Accordingly, it is an object of my invention to provide a method for producing a fracturing gel having the required characteristics but which is not subject to the various disadvantages enumerated above. It is a further object of my invention to prepare a highly satisfactory fracturing gel by forming in a suitable base liquid an alkali metal soap of a higher aliphatic organic acid. It is another object of my invention to provide a composition consisting essentially of a suitable base liquid and a higher aliphatic organic acid soap, which has been formed in situ, having incorporated therein a demulsifying agent. It is a still further object of my invention to provide a method for increasing the productivity of oil, gas or various mineral-bearing formations by first dissolving an oil soluble demulsifier in a suitable base liquid containing an aliphatic organic acid having from about 16 to 20 carbon atoms, forming an alkali metal salt of said acid present in said base liquid to convert the latter into a viscous gel, injecting this gel into the aforesaid formation at the formation breakdown pressure, thereafter injecting a strong acid into the formation to effect a breakdown of the gel, and thereafter removing said gel from the resulting fracture in the formation by producing the latter.

I have now discovered that any suitable base liquid such as, for example, crude oil, kerosene or the like, can be converted into highly satisfactory fracturing gels by adding thereto from about 4 to about 10 weight per cent of an aliphatic organic acid having from 16 to 20 carbon atoms, preferably having one point of unsaturation, and thereafter introducing in the presence of agitation a sufficient quantity of a suitable base, preferably in the form of an aqueous solution, to completely neutralize said acid. While addition of the soap to the oil does not result in the production of a gel, I have found that if the soap, or bodying agent, is formed within the base liquid, the latter is readily converted to a gel having the desired properties. The preparation of gels of this type is essentially independent of surface temperatures, the type of base liquid employed or the impurities contained in such liquid. Gels so prepared possess a sufficiently high viscosity to maintain in suspension the granular propping material contained therein. This propping material is frequently employed to hold open the cracks or fissures in the formation produced by application of the gels under pressure so that the gas, oil, mineral, or other substances can be recovered and preferably consists of sand (16 mesh) or a similar substance utilized generally in a concentration of from about 0.5 pound to about 10 pounds per gallon of viscous gel. The gel employed in carrying out this fracturing operation should have a viscosity of from at least 30 centipoises to about 5,000 centipoises or higher as determined with the Stormer viscosimeter at 600 R. P. M.; for example, from about 75 to several hundred centipoises is ordinarily preferred. After the ingredients of the gel have been mixed, a suitable fracturing composition having the above-stated viscosity range should be formed within at least three to five hours. In general, with a given gel, its viscosity is effected to a large extent by the temperature of the formation which it is desired to fracture. Formation temperatures may ordinarily range from about 100 to about 210° F., the average temperature usually being in the neighborhood of about 140° F. Such temperature conditions, i. e., about 140° F., normally require gels having bodying agents incorporated therein to the extent of about 8 weight per cent; however, at higher temperatures increased quantities of bodying material should be used and at temperatures of the order of 210° F., the bodying agent should be utilized in a concentration of about 10 weight per cent to yield a gel having the desired characteristics.

While viscosity is in a general sense indicative of the ability of the fracturing fluid to penetrate the formation, the filter rate is a more precise measure of such characteristics and is applicable to fluid suspensions of solids or fluids containing plastering agents. The preferred test of a suitable fracturing fluid, therefore, is the filtrate rate. This factor is customarily defined as the volume of liquid collected in a unit time (normally 30 minutes) when a measured sample of liquid is placed in a cylinder closed at the bottom by a supported filter paper and a gas pressure exerted on the surface of such liquid. Hydraulic compositions normally regarded as satisfactory for fracturing formations of the type herein contemplated should exhibit a fluid loss, or filtrate rate, under these circumstances, of 100 cc. or less, preferably 50 cc. or less, in 30 minutes as determined in accordance with the apparatus and procedure described in API Code No. 29, 2nd edition, July 1942 (tentative). A gel having the above properties can be injected under pressure into the formation to produce the desired fracture. In connection with the invention described and claimed herein, the expression "fracturing gel," which appears in the present specification, is intended to refer to a gel having the characteristics enumerated immediately above.

A gel of the type contemplated by my invention is prepared, for example, by adding 8 volume per cent of a suitable aliphatic organic acid, such as oleic acid, to crude oil and while this mixture is being rapidly stirred, there is added a 45 weight per cent aqueous caustic solution. The rapid stirring which is generally found desirable can be accomplished on a large scale by circulating the blend of oil and organic acid at a high rate through a jet mixer and allowing a small, steady stream of base to drain into the mixer. The measurement of the base is not exact, and the amount required is generally dependent upon the efficiency of mixing. To insure the procurement of a satisfactory gel it is ordinarily advisable to prepare about twice the theoretically required amount of base solution and allow it to drain into the mixer at the rate of ¼ of the total solution to each complete circulation of the oil blend. Generally a gel having the desired characteristics is obtained under these conditions after the oil blend has been circulated twice. The excess caustic should be discarded, since, although it will not adversely affect the gel, it will increase the amount of breaker required to lower the viscosity of the gel. In the event an aqueous mineral acid is to be employed to break the gel while the latter is in the formation, a suitable oil soluble demulsifying agent should be added during the mixing operation, generally in concentrations of about 0.5 to about 2 per cent, based on the weight of the oil in order to avoid formation of an emulsion between the gel and the acid breaker solution.

As mentioned above, gels of this type can be broken by the addition of aqueous mineral acid, such as hydrochloric acid, or in case the addition of water to the formation is undesirable, a strong organic acid, such as acetic acid, can be employed, if desired. The acetic acid may be introduced in the form of a liquid hydrocarbon solution, i. e., dissolved in gasoline, or kerosene, or crude oil, the acetic acid and hydrocarbon preferably being present in about equal amounts.

Gels prepared in accordance with the foregoing procedure are generally formed in about 30 seconds and have an API fluid loss of about 30 cc. in 30 minutes. The rate of gelation is essentially unaffected by the temperature of either the oil or caustic solution employed. Typical viscosities of a gel prepared as described above at various temperatures are noted below:

Temperature:                                               Viscosity
    79° F_____cp__ 280
   100° F_____cp__ 195
   125° F_____cp__ 125

This gel is unaffected by exposure to temperatures of the order of 160° F. for a period of four days. At about 79° F., its viscosity is reduced to about 150 cp. by the addition of 20 volume per cent of water while sodium chloride or oil soluble sulphonates do not affect the gel. The gel can be broken by the addition of 6 volume per cent of glacial acetic acid based on the volume of crude oil, or by the addition of 20 volume per cent of 15 per cent hydrochloric acid based on crude oil volume.

After the formation has been fractured in the manner previously referred to, the excess gel is removed by adding a suitable acid gel breaker after which the resulting composition may be washed out of the well bore and partially washed out of the fracture with the crude oil by circulating, swabbing or pumping. Any gel remaining in the fracture is diluted by the crude oil from the formation. If any connate water is present, it will speed up the dilution, since the soap is readily soluble in water. This gel does not form any hard filter cake that would resist dilution; hence there is no danger of plugging the fracture, as has been the case with other prior art gels.

The gels of my invention may be advantageously employed to fracture subterranean formations and the resulting fracture area treated with acid in accordance with the method generally described and claimed by R. F. Farris in co-pending application U. S. Ser. No. 29,922, filed May 28, 1948, now abandoned. Thus, the formation may be fractured by the use of a gel of the type covered by the present invention and thereafter following this operation with a large quantity of non-emulsifying hydrochloric acid. This method of treating acidizable formations possesses several advantages over presently used acidizing procedures inasmuch as it is possible to fracture the formation, enlarge the fracture by acidization and insure a positive viscosity reduction of the gel.

The principal advantage of the gels covered by my invention resides in their ability to be formed under adverse weather conditions, making either heating during the winter months or cooling in the summer unnecessary for field mixing operations. In accordance with my invention satisfactory gels may be rapidly produced from both sour or sweet, high or low gravity crudes or from kerosene under a relatively wide temperature range. Tests have been made at 50° F. and at 160° F.; at both temperature levels satisfactory gels have been obtained. Such gels are much more readily prepared in the field and generally are less expensive than gels having aluminum soaps as the bodying agent. The lower gravity, relatively sour crudes form a slightly thicker gel than the lighter sweet crudes.

The oily or base liquid employed in the preparation of these gels may be selected from a relatively wide range of materials. Thus, in addition to crude oil and kerosene I may employ an animal oil, such as lard oil or fish oil; a vegetable oil, such as cottonseed oil; chlorinated hydrocarbons, or the like. The expression "base liquid" appearing in certain of the appended claims is to be construed as being any oily liquid from which satisfactory fracturing gels can be prepared and includes the group of operative compounds listed immediately above.

As previously mentioned, the aliphatic organic acids employed in accordance with my invention to gel the base liquid may contain from 16 to 20 carbon atoms, and while I generally prefer to use oleic acid for this purpose, other acids of this group, such as palmitic, stearic, linoleic acids, and the like, may likewise be employed.

The alkali metal base used to form the particular acid soap in the base liquid may be selected from any of the carbonates, hydroxides, etc., of lithium, potassium or sodium, sodium hydroxide generally being preferred. In this connection it is to be understood that various ammonium bases such as, for example, the carbonate or hydroxide, may likewise be used for this purpose, and that the expression "alkali metal" base appearing in the present description and certain of the appended claims is intended to include such basic ammonium compounds. I have found that optimum results are usually achieved by the use of an aqueous solution of the base in a concentration from about 25 to 45 weight per cent.

The oil soluble demulsifying agents employed in gels which are to be used in combination with aqueous gel breaker solutions may be selected from a wide range of known materials. In general, I have found that from about 0.5 to about 2 weight per cent of an oil soluble demulsifier consisting essentially of 60 parts of oil soluble sulfonates and 40 parts of aromatic sulfonates performs very satisfactorily in the gel compositions of my invention.

From the foregoing description it will be apparent that the present invention constitutes a distinct advance in the preparation of fracturing gels. Likewise, it will be evident to those skilled in the art that numerous modifications in the procedure set forth above may be made without departing from the scope of my invention. In general, it may be said that any gels prepared by forming an alkali metal soap of an aliphatic organic acid having from 16 to 20 carbon atoms in base liquids of the type herein defined and the use of such a gel to fracture hydraulically oil or gas bearing formations are included within the scope of my invention.

What I claim is:

1. A gel which is readily destructible by acid but which is relatively insensitive to substantial changes in initial viscosity at temperatures ranging from about 100° to about 210° F., said viscosity ranging from about 30 to about 5000 centipoises, said gel having been prepared by adding to a base liquid, containing from about 4 to about 10 weight per cent of an aliphatic acid having from 16 to 20 carbon atoms, a sufficient quantity of an alkali metal base in the form of an aqueous solution containing from about 25 to about 45 weight per cent of said alkali metal base, vigorously agitating the aqueous mixture of alkali metal base and acid at temperatures of from about 50° to about 160° F. until neutralization is complete, whereby a soap or bodying agent is formed in said base liquid in a concentration up to about 10 weight per cent, and retaining in the gel thus prepared all the water added thereto by the introduction of said aqueous solution of alkali metal base.

2. The gel of claim 1 in which oleic acid is the aliphatic organic acid and crude oil is the base liquid.

3. The gel of claim 1 in which the alkali metal base employed is a sodium base.

4. The gel of claim 1 wherein from about 0.5 to about 2.0 per cent of an oil-soluble demulsifying agent based on the weight of the oil in said gel is incorporated therein.

5. The gel of claim 1 in which a sodium base is employed and wherein from about 0.5 to about 2.0 per cent of an oil-soluble demulsifying agent based on the weight of the oil in said gel is incorporated therein.

RICHARD G. McCHRYSTAL.

References Cited in the file of this patent

UNITED STATES PATENTS

| Number | Name | Date |
|---|---|---|
| 1,810,555 | Edmiston | June 16, 1931 |
| 2,300,325 | Leeuwen | Oct. 27, 1942 |
| 2,379,516 | Garrison | July 3, 1945 |
| 2,383,906 | Zimmer et al. | Aug. 28, 1945 |
| 2,385,361 | Laliberte | Sept. 25, 1945 |

FOREIGN PATENTS

| Number | Country | Date |
|---|---|---|
| 166,274 | Great Britain | July 11, 1921 |

OTHER REFERENCES

The Oil and Gas Journal, October 14, 1948, pages 76, 77, 78 and 103.

Klemgard "Lubricating Greases," 1937, pages 396, 411.